(12) United States Patent
Chao et al.

(10) Patent No.: US 8,907,908 B2
(45) Date of Patent: Dec. 9, 2014

(54) METHOD FOR IDENTIFYING MULTIPLE TOUCH OBJECTS

(75) Inventors: Tsz-Hsuan Chao, Taoyuan County (TW); Sheng-Tsai Huang, Tainan (TW)

(73) Assignee: Elan Microelectronics Corporation, Hsinchu (TW)

( * ) Notice: Subject to any disclaimer, the term of this patent is extended or adjusted under 35 U.S.C. 154(b) by 367 days.

(21) Appl. No.: 13/437,628

(22) Filed: Apr. 2, 2012

(65) Prior Publication Data

US 2013/0106732 A1 May 2, 2013

(30) Foreign Application Priority Data

Oct. 26, 2011 (TW) .............................. 100138813 A (51) Int. Cl.
*G06F 3/041* (2006.01)

(52) U.S. Cl.
CPC .... *G06F 3/0416* (2013.01); *G06F 2203/04104* (2013.01)
USPC ....................................... 345/173; 178/18.01

(58) Field of Classification Search
CPC ............................................ G06F 2203/04104
USPC ..................... 345/173–183; 178/18.01–18.11, 178/19.01–19.07, 20.01–20.04
See application file for complete search history.

(56) References Cited

U.S. PATENT DOCUMENTS

| | | | |
|---|---|---|---|
| 2008/0158147 A1* | 7/2008 | Westerman et al. | 345/156 |
| 2009/0095540 A1* | 4/2009 | Zachut et al. | 178/18.03 |
| 2009/0184934 A1* | 7/2009 | Lin et al. | 345/173 |
| 2010/0289754 A1* | 11/2010 | Sleeman et al. | 345/173 |
| 2011/0012856 A1* | 1/2011 | Maxwell et al. | 345/173 |
| 2011/0025623 A1* | 2/2011 | Lin | 345/173 |
| 2011/0102339 A1* | 5/2011 | Lin et al. | 345/173 |
| 2011/0242022 A1* | 10/2011 | Wen | 345/173 |
| 2011/0298744 A1* | 12/2011 | Souchkov | 345/174 |
| 2011/0310040 A1* | 12/2011 | Ben-Shalom et al. | 345/173 |
| 2012/0242595 A1* | 9/2012 | Yang et al. | 345/173 |
| 2013/0106733 A1* | 5/2013 | Wang et al. | 345/173 |
| 2013/0169561 A1* | 7/2013 | Park et al. | 345/173 |
| 2013/0207934 A1* | 8/2013 | Jang et al. | 345/174 |

* cited by examiner

*Primary Examiner* — Gene W Lee
(74) *Attorney, Agent, or Firm* — Birch, Stewart, Kolasch & Birch, LLP (57) ABSTRACT

A method for identifying multiple touch objects has steps of reading at least one touched cluster to be identified in a sensing frame, determining a range of each one of the at least one touched cluster to be identified, comparing the range of each touched cluster to be identified with a first preset division range, if the range of the touched cluster to be identified exceeds the first preset division range, reducing a sensing value of each one of at least one middle sensing point within the first touched cluster to be divided, determining a count of center sensing points of each first touched cluster to be divided, and dividing the first touched cluster to be divided containing multiple center sensing points. Accordingly, the present invention correctly identifies multiple touch objects from a single touched cluster arising from an excessively large line-to-line space.

83 Claims, 9 Drawing Sheets

| 0 | 0 | 0 | 0 | 0 | 0 | 0 |
|---|---|---|---|---|---|---|
| 0 | 42 | 38 | 25/2 | 57 | 0 | 0 |
| 0 | 80 | 83 | 63/2 | 88 | 24 | 0 |
| 0 | 0 | 0 | 0 | 0 | 0 | 0 |

FIG. 4B

| 0 | 0 | 0 | 0 | 0 | 0 | 0 |
|---|---|---|---|---|---|---|
| 0 | 42 | 38 | 25/2 | 57 | 0 | 0 |
| 0 | 80 | 83 | 63/2 | 88 | 24 | 0 |
| 0 | 0 | 0 | 0 | 0 | 0 | 0 |

FIG. 4C

| 0 | 0 | 0 | 0 | 0 | 0 | 0 |
|---|---|---|---|---|---|---|
| 0 | 42 | 38 | 25/2 | 57 | 0 | 0 |
| 0 | 80 | 83 | 63/2 | 88 | 24 | 0 |
| 0 | 0 | 0 | 0 | 0 | 0 | 0 |

METHOD FOR IDENTIFYING MULTIPLE TOUCH OBJECTS

BACKGROUND OF THE INVENTION

1. Field of the Invention

The present invention relates to a method for identifying multiple touch objects and more particularly to a method capable of precisely identifying multiple positions touched by corresponding objects.

2. Description of the Related Art

As conventional touch panels identify positions touched by objects using scanning methods, sensing lines are formed on the touch panels in a crosswise pattern. The line-to-line spaces of the sensing lines may vary touch panel by touch panel. As to capacitive touch panels for sensing finger touch, it is easy to incorrectly identify positions touched by two or more fingers as by one finger for sake of excessively large line-to-line space.

Hence, how to correctly identify the number and positions of actual touch objects on a touch panel is indeed a technical problem of current multi-touch touch panels to be tackled.

SUMMARY OF THE INVENTION

An objective of the present invention is to provide a method for identifying multiple touch objects capable of effectively and correctly identifying multiple touch objects from a single touched cluster.

To achieve the foregoing objective, the method for identifying multiple touch objects has steps of:

reading at least one touched cluster to be identified in a sensing frame and determining a range of each one of the at least one touched cluster to be identified;

comparing the range of each touched cluster to be identified with a first preset division range, if the range of the touched cluster to be identified exceeds the first preset division range, determining the touched cluster to be identified as a first touched cluster to be divided and performing a next step, and otherwise, resuming a previous step;

reducing a sensing value of each one of at least one middle sensing point within the first touched cluster to be divided;

determining a count of center sensing points of each first touched cluster to be divided, wherein each sensing point is aligned with a center of a range of a touch object, other sensing points within the range are determined, and the sensing point is a center sensing point if the sensing value of the sensing point is the highest among the sensing values of all the sensing points within the range; and dividing the first touched cluster to be divided containing multiple center sensing points.

As overcrowded touch objects may be treated as a single touched cluster to be identified, the present invention first identifies the touched cluster to be identified with an excessively large range, then reduces the sensing value of the middle sensing point within the touched cluster to be identified, determines the number of the center sensing points having the two peak sensing values within the touched cluster to be identified, and if at least two center sensing points are determined, the touched cluster to be identified can be divided into multiple touch objects. Accordingly, the present invention correctly identifies multiple touch objects from a single touched cluster arising from an excessively large line-to-line space.

The method further has a division statistical reference step of:

accumulating a count of divisions of multiple previous sensing frames; and after the step of determining a count of center sensing points of each first touched cluster to be divided is finished and the first touched cluster to be divided is confirmed to have multiple center sensing points, dividing the first touched cluster to be divided if the number of divisions is greater than a first statistical critical value and remaining not dividing if the number of divisions is lower than the first statistical critical value.

A touch panel usually outputs hundreds of sensing frames per second and users' touch habits have their specific patterns. With the division statistical reference step, the present invention can certainly enhance the success rate of division according to users' current touch habits.

Other objectives, advantages and novel features of the invention will become more apparent from the following detailed description when taken in conjunction with the accompanying drawings.

DETAILED DESCRIPTION OF THE INVENTION

Figure 1:
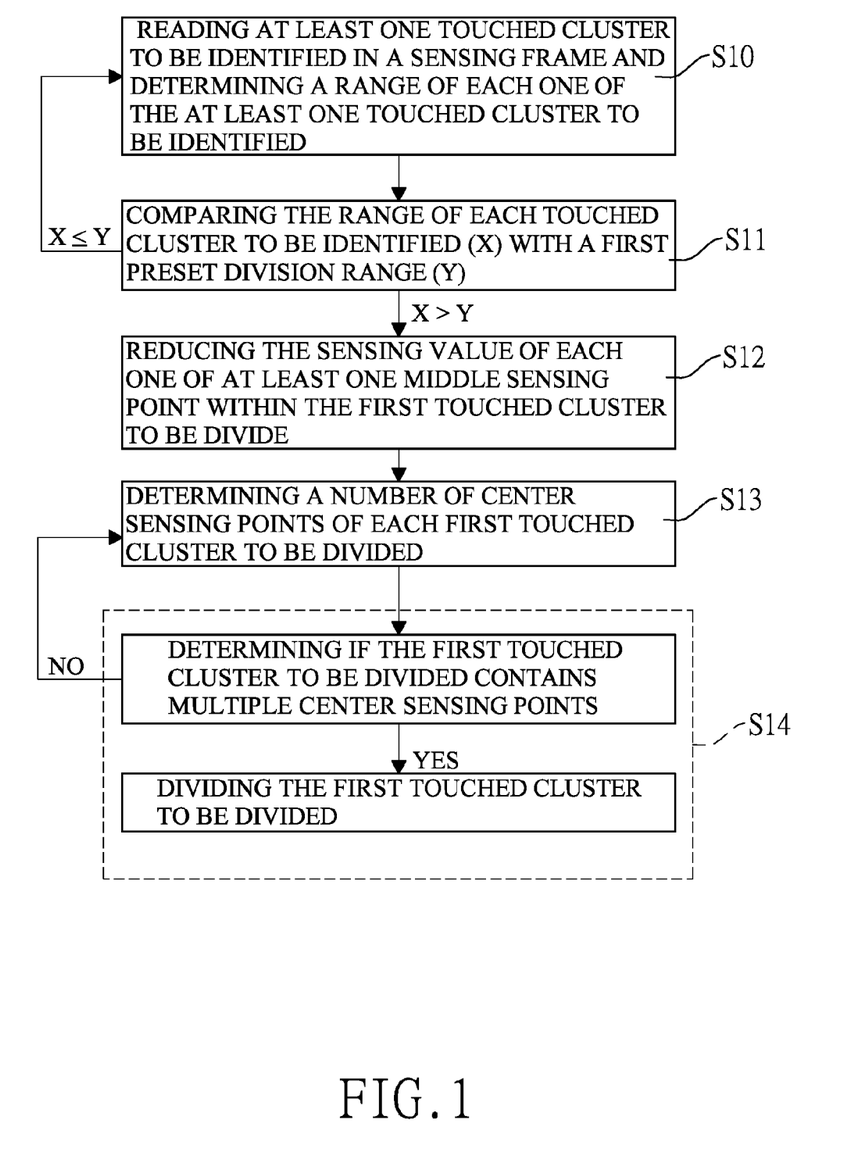
FIG. 1 is a flow diagram of a first embodiment of a method for identifying multiple touch objects in accordance with the present invention.

With reference to FIG. 1, a first embodiment of a method for identifying multiple touch objects in accordance with the present invention has the following steps.

Figure 2A:
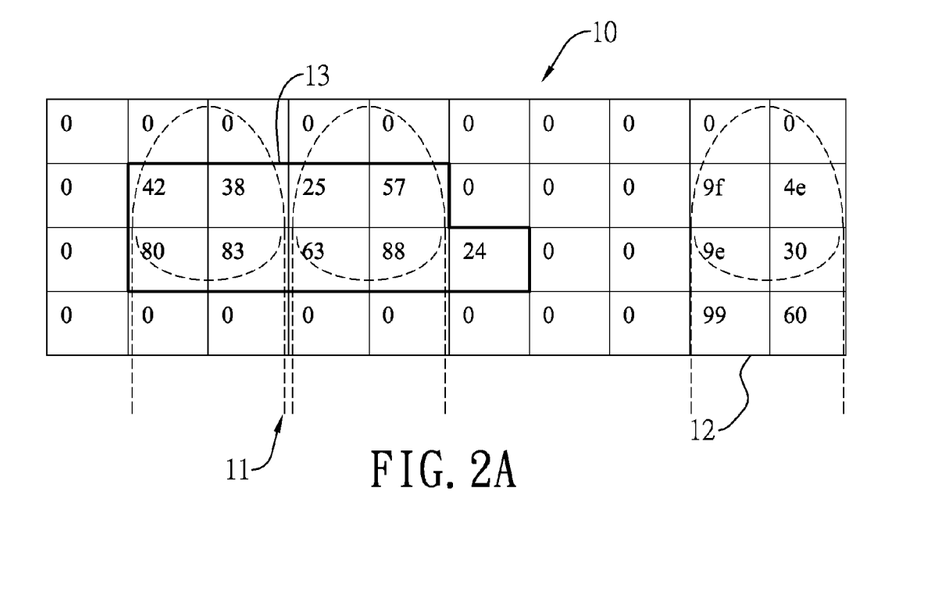
FIG. 2A is a schematic view of two touched clusters to be identified on a sensing frame sensed by the method in FIG. 1.

Read at least one touched cluster to be identified in a sensing frame and determine a range of each one of the at least one touched cluster to be identified (S10). With reference to FIG. 2A, when one finger and two other adjacent fingers simultaneously touch a touch panel, a sensing frame 10 scanned and outputted by the touch panel has two touched clusters to be identified 11, 12 on the sensing frame to correspond to two touched positions on the sensing frame 10. Each sensing point within each touched cluster to be identified 11, 12 has a non-zero sensing value. The touched cluster to be identified 11 corresponding to the two adjacent fingers has two sensing peak values.

Compare the range of each touched cluster to be identified 11, 12 with a first preset division range (S11). If the range of the touched cluster to be identified 11, 12 exceeds the first preset division range, determine the touched cluster to be identified 11, 12 as a first touched cluster to be divided and perform a next step. Otherwise, resume the previous step S10. With reference to FIG. 2A, the first preset division range corresponds to a range of the sensing points touched by a finger having a regular size on the current touch panel, which may be a critical value of size (a count of sensing points), a length along X axis (a count of sensing points along X axis) or a length along Y axis (a count of sensing points along Y axis). Suppose that the regular finger size corresponds to a range of 3×3 sensing points on the current touch panel, identifying if each touched cluster to be identified 11, 12 is the first touched cluster to be divided can be performed by calculating if the number of the sensing points within the touched cluster to be identified 11, 12 exceeds 9, if the number of sensing points along X axis exceeds 5, or if the number of sensing points along Y axis exceeds 5. If any one of the foregoing conditions is met, the touched cluster to be identified 11, 12 is determined as the first touched cluster to be divided 13.

Figure 2B:
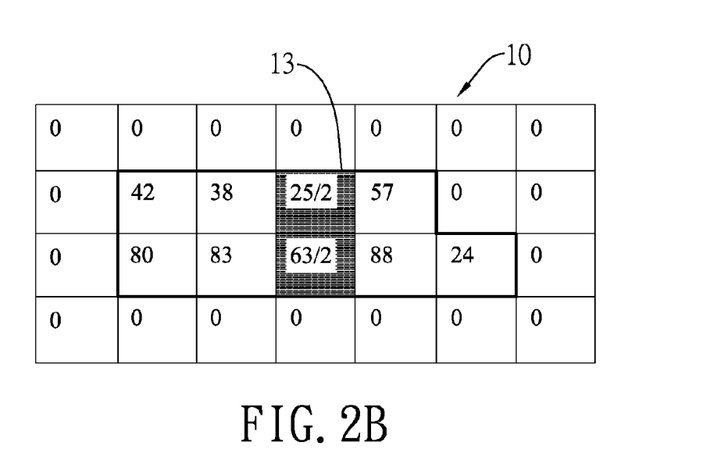
FIG. 2B is a schematic view of a first touched cluster to be divided on the sensing frame in FIG. 2A.
Figure 3A:
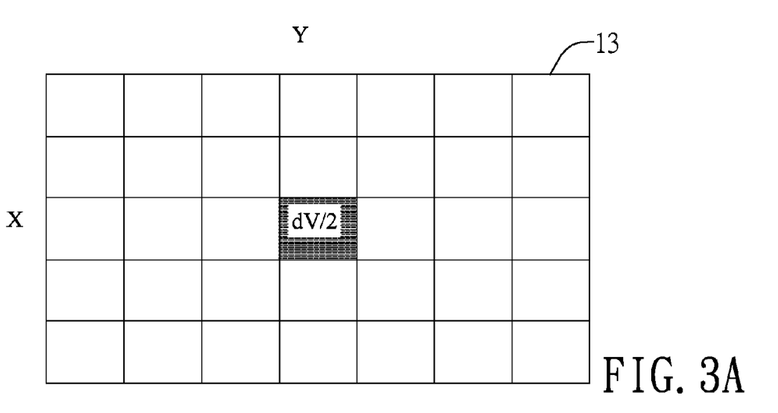
FIG. 3A is a schematic view of a middle sensing point having a reduced sensing value in a first touched cluster to be divided of the sensing frame in FIG. 2B.
Figure 3B:
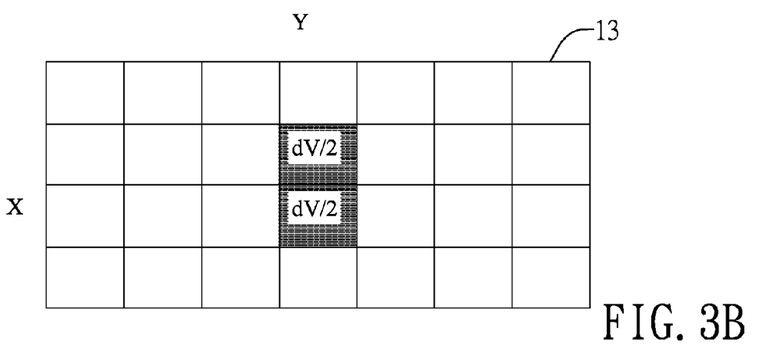
FIG. 3B is a schematic view of two middle sensing points each having a reduced sensing value in the first touched cluster to be divided of the sensing frame in FIG. 2B.
Figure 3C:
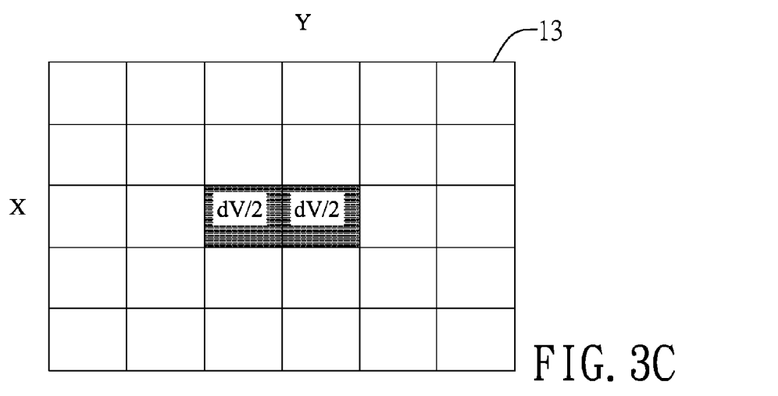
FIG. 3C is another schematic view of two middle sensing points each having a reduced sensing value in the first touched cluster to be divided of the sensing frame in FIG. 2B.
Figure 3D:
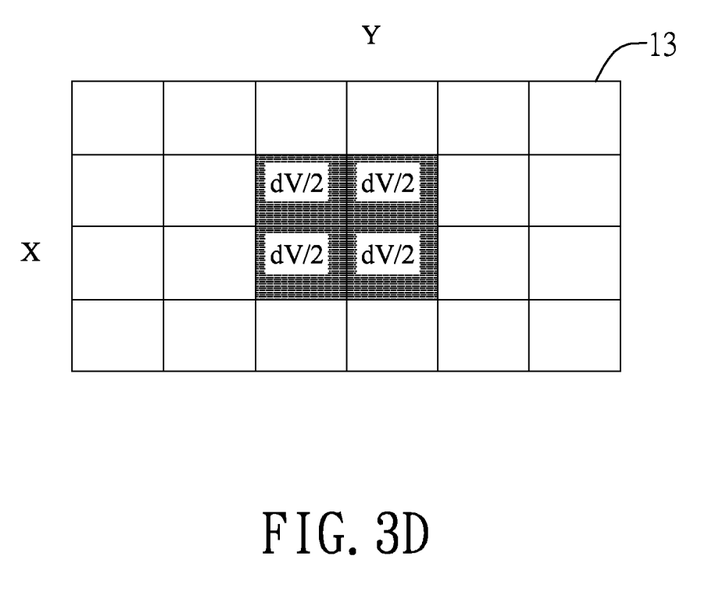
FIG. 3D is a schematic view of four middle sensing points each having a reduced sensing value in the first touched cluster to be divided of the sensing frame in FIG. 2B.

Reduce the sensing value (dV) of each one of at least one middle sensing point within the first touched cluster to be divided 13 (S12). With reference to FIG. 2B, as the first touched cluster to be divided 13 determined by the previous step corresponds to at least two overcrowding fingers, the sensing value of at least one selected middle sensing point of the first touched cluster to be divided 13 needs to be further reduced. Depending on the range of the first touched cluster to be divided 13, selection of the middle sensing point of the first touched cluster to be divided 13 may vary. With reference to FIGS. 3A to 3D, the sensing value of the sensing point selected from the following table according to the number of the sensing points along X axis and the number of the sensing points along Y axis needs to be reduced.

| Number of sensing points along X axis | Number of sensing points along Y axis | Sensing point selected to reduce the sensing value thereof |
| --- | --- | --- |
| Odd | Odd | One sensing point intersected by a middle column and a middle row of the first touched cluster to be divided |
| Odd | Even | Two sensing points intersected by a middle column and two adjacent middle rows of the first touched cluster to be divided |
| Even | Odd | Two sensing points intersected by a middle row and two adjacent middle columns of the first touched cluster to be divided |
| Even | Even | Four sensing points intersected by two adjacent middle rows and two adjacent middle columns. |

The sensing value of each sensing point selected according to the table is reduced to one half thereof (dV/2) or other lower values. Moreover, when at least two sensing points are selected according to the table, the maximal sensing value or the minimal sensing value of the selected sensing point is reduced.

Figure 4A:
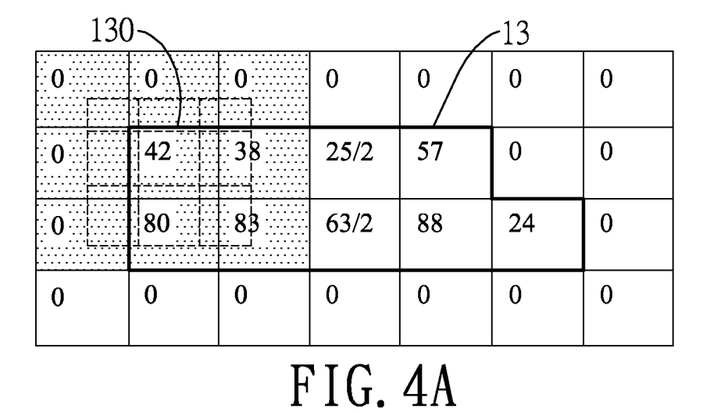
FIG. 4A is a first schematic view of an expanded range of one of the sensing points in the first touched cluster to be divided in FIG. 2B for determining if the sensing point is a center sensing point.

Determine a count of center sensing points of each first touched cluster to be divided (S13). Each sensing point is aligned with a center of a range consisted of multiple spending points, other sensing points within the range are determined, and the sensing point is a center sensing point if the sensing value of the sensing point is the highest among the sensing values of all the sensing points within the range. With reference to FIG. 4A, given a range expanded for a finger touch as an example, the range consisting of the multiple sensing points is a n×m (3×3 for example) sensing point array (shown in a dotted frame) having n rows and m columns. Determination of a center sensing point using the range of each sensing point is performed by the following steps in another embodiment.

Sum up the sensing values of the sensing points of each of the three rows (X axis) and those of the sensing points of each of the three columns (Y axis).

Determine if the sum of the sensing values of the middle row (X axis) is not less than those of the sensing values of the other two rows (X axis) and if the sum of the sensing values of the middle column (Y axis) is not less than those of the sensing values of the other two columns (Y axis).

Figure 4B:
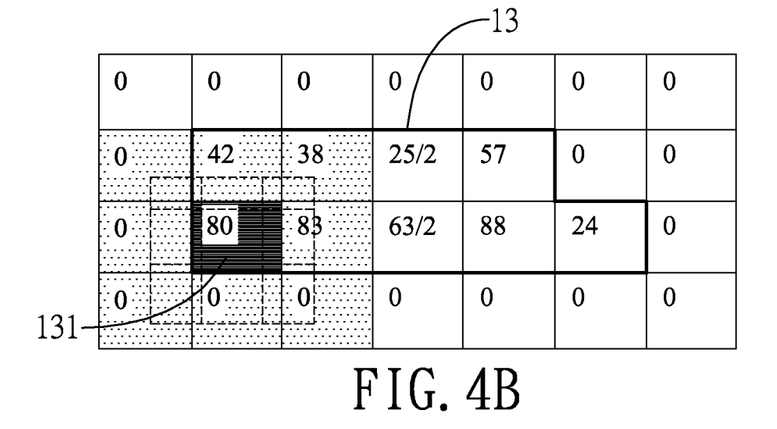
FIG. 4B is a second schematic view of an expanded range of one of the sensing points in the first touched cluster to be divided in FIG. 2B for determining if the sensing point is a center sensing point.
Figure 4C:
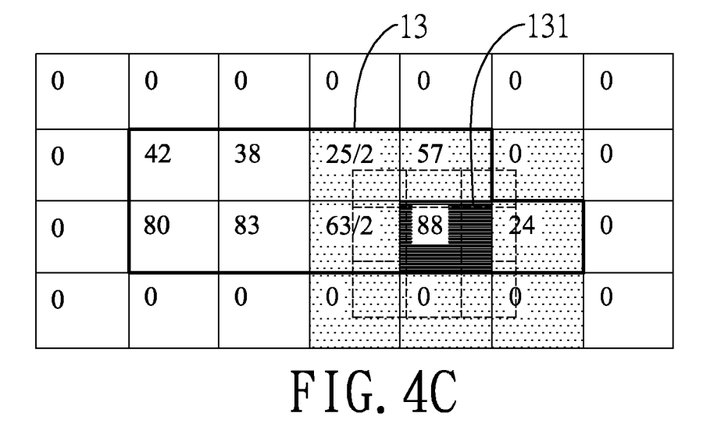
FIG. 4C is a first schematic view of an expanded range of one of the sensing points in the first touched cluster to be divided in FIG. 2B for determining if the sensing point is a center sensing point.

If the determination of the previous step holds true, the current sensing point is a center sensing point 131. With reference to FIGS. 4B and 4C, as there are nine sensing points having a non-zero sensing value respectively within the first touched cluster to be divided 13, determination is performed nine times. The two sensing points having the respective sensing values 80 and 88 are determined as the center sensing points 131.

Divide the first touched cluster to be divided 13 containing multiple center sensing points 131 (S14). With reference to FIGS. 4A to 4C, as the two center sensing points 131 determined by the previous step satisfy the condition that the first touched cluster to be divided 13 has multiple center sensing points 131, the first touched cluster to be divided can therefore be divided. The first touched cluster to be divided originally considered to be touched by a single touch object can thus be divided into two groups touched by two touch objects.

Figure 5:
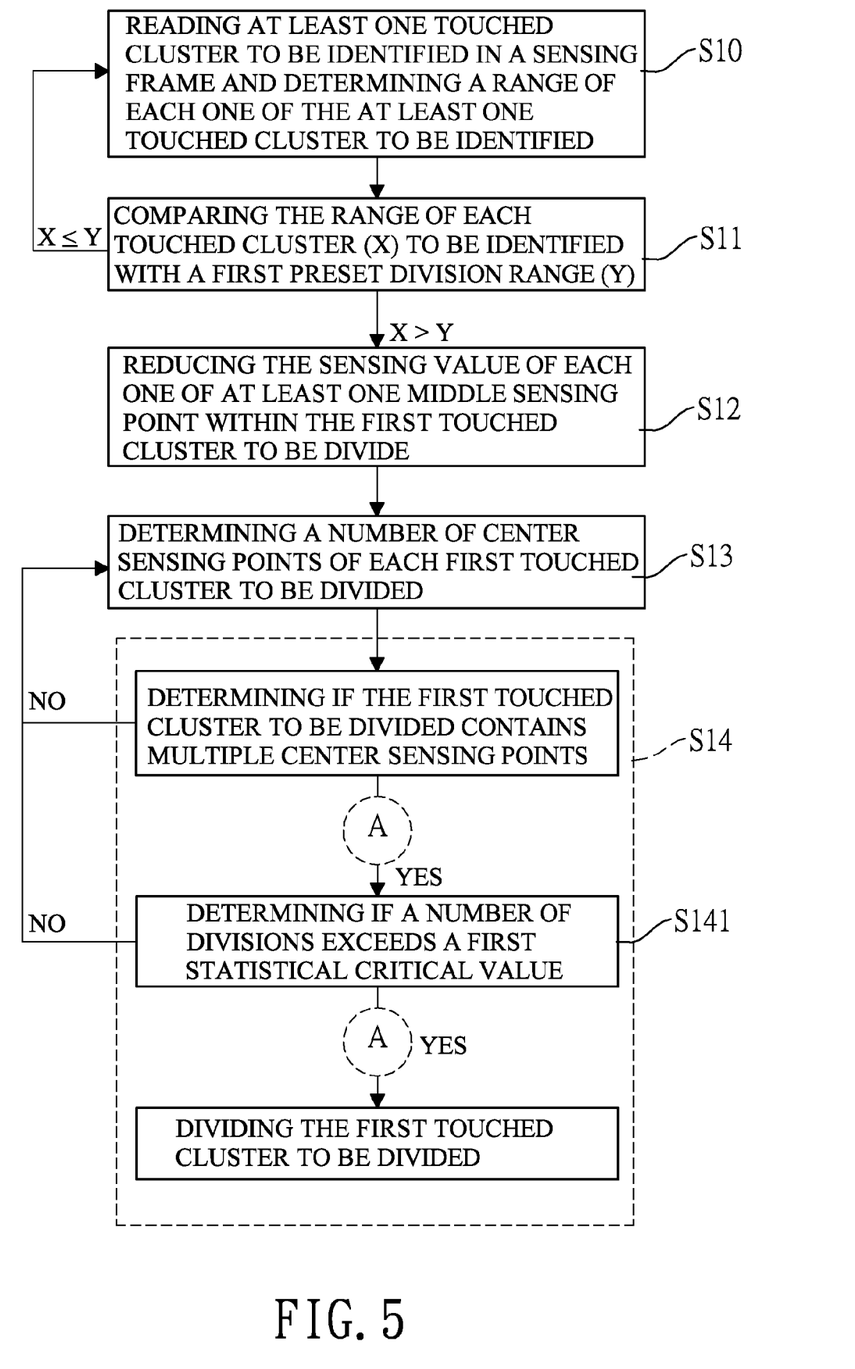
FIG. 5 is a flow diagram of a second embodiment of a method for identifying multiple touch objects in accordance with the present invention.

As the method in FIG. 1 divides the touched clusters to be identified 11, 12 based on the condition of the size of the range thereof, there is a chance that the touched cluster to be identified having a large range and touched by a single finger is incorrectly divided as the two groups touched by two touch objects. With reference to FIG. 5, a second embodiment of a method for identifying multiple touch objects in accordance with the present invention serves to lower the possibility of the incorrect division and differs from the first embodiment in an additional division statistical reference step S141. Since a touch panel outputs hundreds of sensing frames per second and it lasts few seconds for users to finish touching the touch panel, the former division result of the sensing frames can be accumulated to increase the accuracy in determining if the first touched cluster to be divided 13 needs to be divided. The present embodiment presets a statistical critical value and accumulates a count of divisions of multiple previous sensing frames. After the step of determining a count of center sensing points of each first touched cluster to be divided (S13) is finished and the first touched cluster to be divided 13 is confirmed to have multiple center sensing points 131, the number of divisions must be determined if they exceed a first statistical critical value. The first touched cluster to be divided 13 is divided again if positive and remains undivided if negative.

As the accumulation of the number of divisions can be updated on a non-real time basis, a step of updating the number of divisions (A) can be performed before the step of determining if the number of divisions exceeds the first statistical critical value. The step of determining if the number of divisions exceeds the first statistical critical value can be performed after the most recent updated number of divisions is obtained. Alternatively, the step of updating the number of divisions (A) can be performed after the first touched cluster to be divided 13 is confirmed to be divided.

Figure 6:
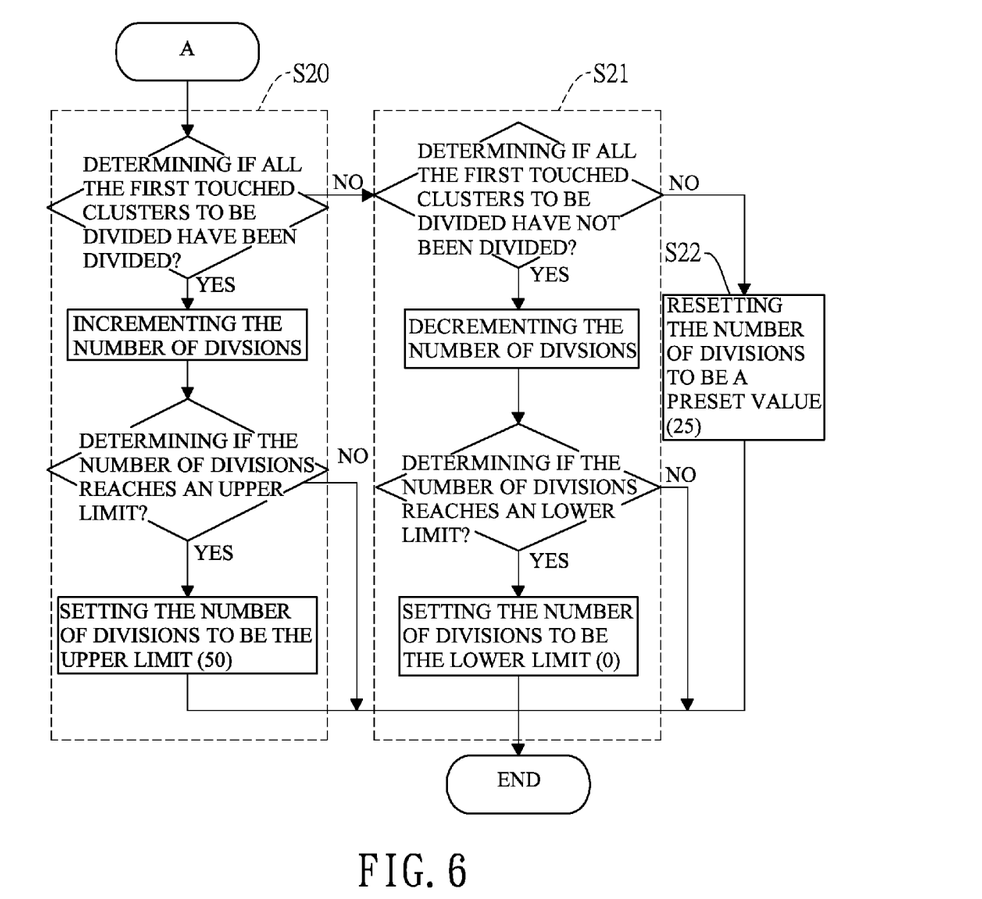
FIG. 6 is a flow diagram of a step for updating a count of divisions in the method in FIG. 5.

With reference to FIG. 6, a step for updating the number of divisions in the method in FIG. 5 has the following steps.

(a) Accumulate the number of divisions after all first touched clusters to be divided of previous one sensing frame are divided until the accumulated number of divisions reaches an upper limit (S20). Given an example of 100 sensing frames read per second, the upper limit may be set to 50.

(b) If all the first touched clusters to be divided in the previous one sensing frame are not divided, reduce the number of divisions until the number of divisions reaches a lower limit (S21). The lower limit may be set to zero.

(c) After part of the first touched clusters to be divided of previous one sensing frame are divided, reset the number of divisions to be a preset value (S22). The preset value is one half of the upper limit. Given the example of 100 sensing frames read per second, the preset value may be set to 25.

With the foregoing step of updating the numbers of division, if the first statistical critical value is set to a value less than the preset value, such as 20, and the current sensing frame is additionally touched by two adjacent fingers in comparison with the previous one sensing frame touched by a single finger, the step (c) is performed to reset the number of divisions to the preset value. As the first statistical critical value is lower than the preset value, the first touched cluster to be divided, which is generated by two adjacent fingers, is divided, so that the number of fingers and positions to be identified can be closer to those of actual conditions.

Figure 7:
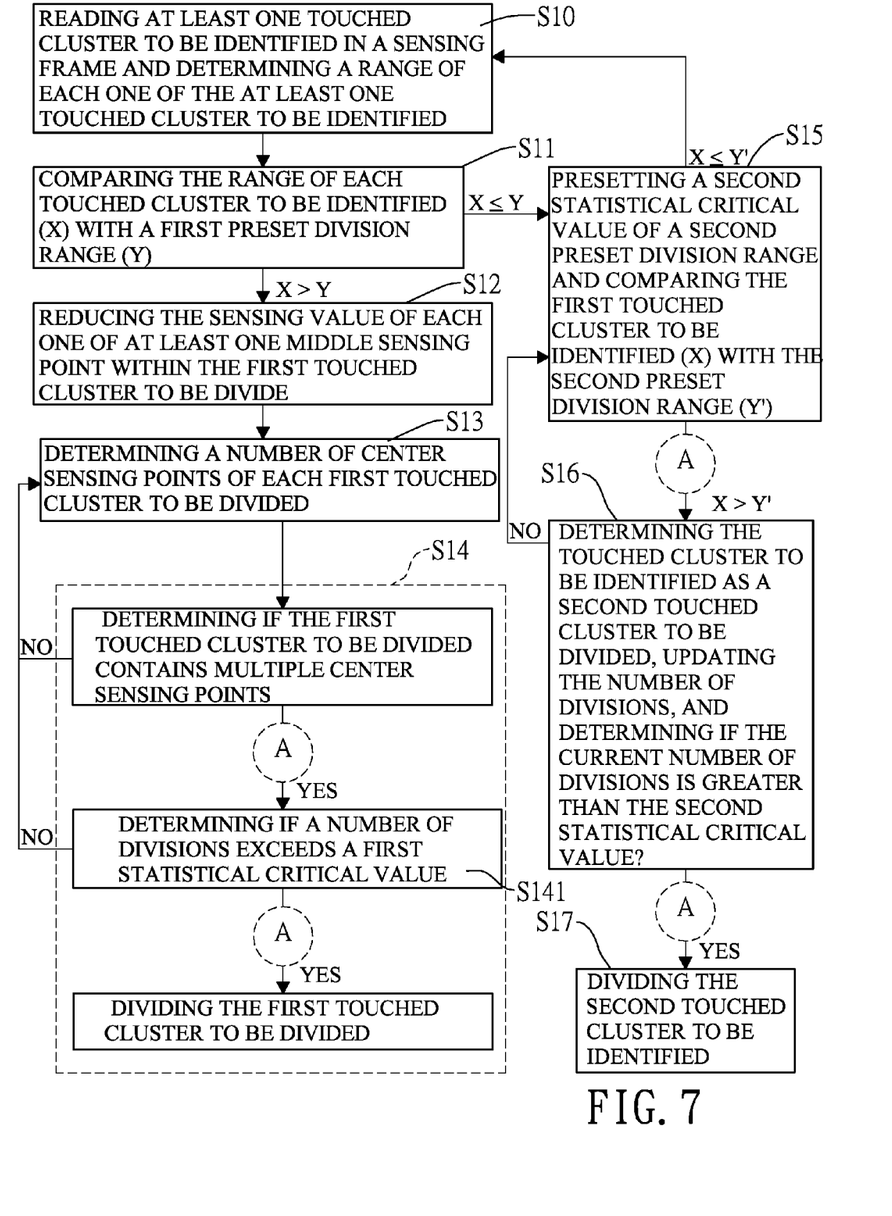
FIG. 7 is a flow diagram of a third embodiment of a method for identifying multiple touch objects in accordance with the present invention.

To further enhance the accuracy of division, with reference to FIG. 7, a third embodiment of identifying multiple touch objects in accordance with the present invention is derived from the second embodiment, and targets at avoiding screening out the touch objects caused by multiple fingers touching the portions of sensing frames other than the first touched clusters to be divided. The present embodiment presets a second preset division range being smaller than the first preset division range, that is, the size, the length along X axis and the length along Y axis of the second preset division range are smaller than those of the first preset division range, and presets a second statistical critical value greater than the first statistical critical value. When the range of the touched cluster to be identified is smaller than the first preset division range and is greater than the second preset division range (S15), determine the touched cluster to be identified as a second touched cluster to be divided and update the number of divisions (A).

Compare the current number of divisions with the second statistical critical value (S16). The second touched cluster to be divided is divided if the current number of divisions is greater than the second statistical critical value (S17), and remains undivided if the current number of divisions is less than the second statistical critical value.

If the second statistical critical value is greater than the preset value, such as 30, in the step of updating the number of divisions, and if the current sensing frame is additionally touched by a single finger in comparison with the previous one sensing frame touched by two adjacent fingers, the step (c) is performed to reset the number of divisions to the preset value. As the second statistical critical value is greater than the preset value, the second touched clusters corresponding to the single finger are not incorrectly divided.

Likewise, the step of updating the number of divisions (A) can be performed after the second touched cluster to be divided is confirmed to be divided.

Figure 8:
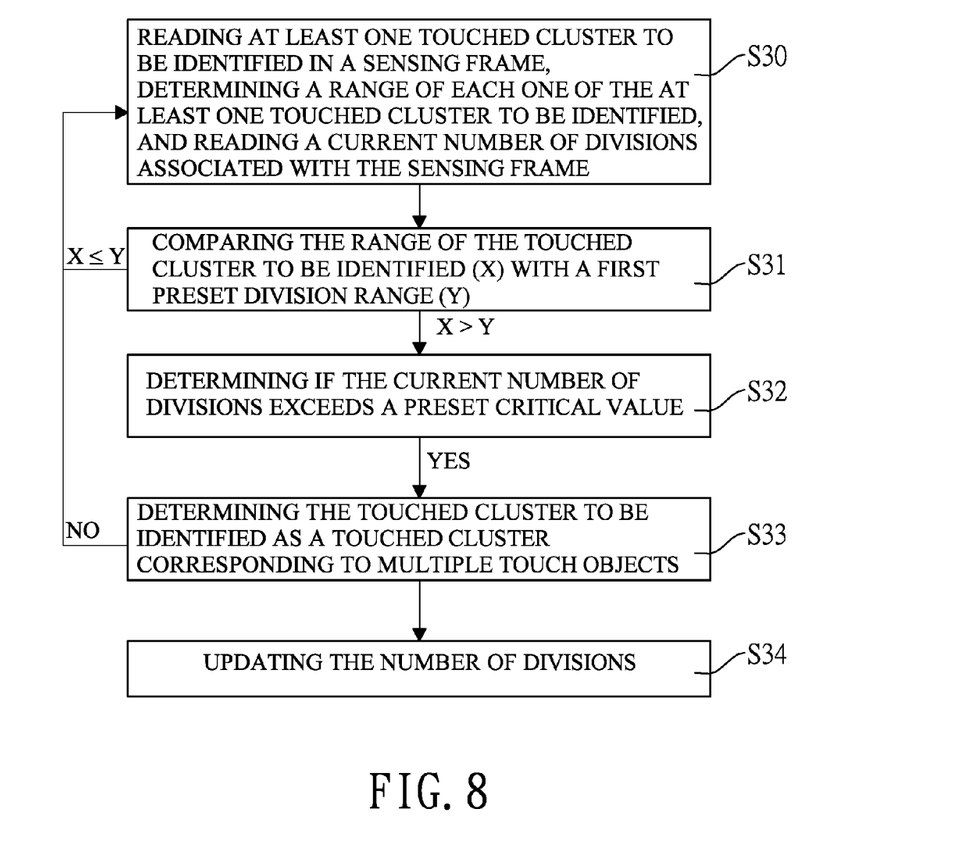
FIG. 8 is a flow diagram of a fourth embodiment of a method for identifying multiple touch objects in accordance with the present invention.

With reference to FIG. 8, a fourth embodiment of a method for identifying multiple touch objects in accordance with the present invention has the following steps.

Read at least one touched cluster to be identified in a sensing frame, determine a range of each one of the at least one touched cluster to be identified, and read a current count of divisions associated with the sensing frame (S30). The current number of divisions is obtained by accumulating the numbers of divisions respectively associated with all previous sensing frames done with division.

Compare the range of the touched cluster to be identified with a first preset division range (S31). If the range of the touched cluster to be identified exceeds the first preset division range, further determine if the current number of divisions exceeds a preset critical value (S32).

If positive, the likelihood of division is high recently and determine the touched cluster to be identified as a touched cluster done with division and corresponding to multiple touch objects (S33).

Update the number of divisions (S34). The step of updating the number of divisions is illustrated in FIG. 6 and is not repeated here.

When a touched cluster to be identified is determined as a touched cluster to be divided, the sensing values of the middle sensing points within the touched cluster to be divided are reduced to complete the division. The detailed steps of reducing the sensing values of the middle sensing points are illustrated in FIGS. 3A to 3D and are not repeated here.

The method of the present invention first determines an excessively large range of a touched cluster to be identified and reduces the sensing values of the middle sensing points of the touched cluster to be identified so that the touched cluster to be identified generates two sensing peak values, further determines a count of center sensing points associated with the two peak values of the touched cluster to be identified, and divides the touched cluster to be divided into multiple touch objects when there are at least two center sensing points available. Accordingly, the present invention can avoid incorrectly determining a single touch object as multiple touch objects as a result of excessively large line-to-line space. Additionally, a touch panel usually outputs hundreds of sensing frames per second and users' touch habits have their specific patterns. With the division statistical reference step, the present invention can certainly enhance the success rate of division according to users' current touch habits.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for identifying multiple touch objects comprising steps of:

reading at least one touched cluster to be identified in a sensing frame and determining a range of each one of the at least one touched cluster to be identified;

comparing the range of each touched cluster to be identified with a first preset division range, if the range of the touched cluster to be identified exceeds the first preset division range, determining the touched cluster to be identified as a first touched cluster to be divided and performing a next step, and otherwise, resuming a previous step;

selecting one sensing point intersected by a middle column and a middle row of the first touched cluster to be divided when a count of sensing points along X axis is odd and a count of sensing points along Y axis is odd, and reducing a sensing value of the selected sensing point;

selecting two sensing points intersected by a middle column and two adjacent middle rows of the first touched cluster to be divided when a count of sensing points along X axis is odd and a count of sensing point along Y axis is even, and reducing a sensing value of at least one of the two selected sensing points;

selecting two sensing points intersected by a middle row and two adjacent middle columns of the first touched cluster to be divided when a count of sensing points along X axis is even and a count of sensing points along Y axis is odd, and reducing a sensing value of at least one of the two selected sensing points;

selecting four sensing points intersected by two adjacent middle rows and two adjacent middle columns of the first touched cluster to be divided when a count of sensing points along X axis is even and a count of sensing points along Y axis is even, and reducing a sensing value of at least one of the four selected sensing points;

determining a count of center sensing points of each first touched cluster to be divided, wherein each sensing point is aligned with a center of a range consisting of multiple sensing points the center sensing point is determined according to the sensing values of the sensing points within the range; and dividing the first touched cluster to be divided containing multiple center sensing points.

2. The method as claimed in claim 1, wherein the at least one touched cluster to be identified is read from the sensing frame scanned and outputted by a touch panel.

3. The method as claimed in claim 2, further comprising a division statistical reference step of:

accumulating a count of divisions of multiple previous sensing frames; and after the step of determining a count of center sensing points of each first touched cluster to be divided is finished and the first touched cluster to be divided is confirmed to have multiple center sensing points, dividing the first touched cluster to be divided if the number of divisions is greater than a first statistical critical value and remaining not dividing if the number of divisions is lower than the first statistical critical value.

4. The method as claimed in claim 3, further comprising a step for updating the number of divisions having steps of:

accumulating the number of divisions after all first touched clusters to be divided of previous one sensing frame are divided until the accumulated number of divisions reaches an upper limit;

if all the first touched clusters to be divided in the previous one sensing frame are not divided, reducing the number of divisions until the number of divisions reaches a lower limit; and after part of the first touched clusters to be divided of previous one sensing frame are divided, resetting the number of divisions to be a preset value.

5. The method as claimed in claim 4, wherein the step for updating the number of divisions is performed before the division statistical reference step.

6. The method as claimed in claim 4, wherein the step for updating the number of divisions is performed after the step of dividing the first touched cluster to be divided.

7. The method as claimed in claim 1, wherein the first preset division range is a critical value of size (a count of sensing points), a length along X axis (a count of sensing points along X axis) or a length along Y axis (a count of sensing points along Y axis).

8. The method as claimed in claim 2, wherein the first preset division range is a critical value of size (a count of sensing points), a length along X axis (a count of sensing points along X axis) or a length along Y axis (a count of sensing points along Y axis).

9. The method as claimed in claim 3, wherein the first preset division range is a critical value of size (a count of sensing points), a length along X axis (a count of sensing points along X axis) or a length along Y axis (a count of sensing points along Y axis).

10. The method as claimed in claim 4, wherein the first preset division range is a critical value of size (a count of sensing points), a length along X axis (a count of sensing points along X axis) or a length along Y axis (a count of sensing points along Y axis).

11. The method as claimed in claim 1, wherein the step of determining a count of center sensing points of each first touched cluster to be divided comprising determining a sensing point with the highest sensing value within the range as the center sensing point.

12. The method as claimed in claim 2, wherein the step of determining a count of center sensing points of each first touched cluster to be divided comprising determining a sensing point with the highest sensing value within the range as the center sensing point.

13. The method as claimed in claim 3, wherein the step of determining a count of center sensing points of each first touched cluster to be divided comprising determining a sensing point with the highest sensing value within the range as the center sensing point.

14. The method as claimed in claim 4, wherein the step of determining a count of center sensing points of each first touched cluster to be divided comprising determining a sensing point with the highest sensing value within the range as the center sensing point.

15. The method as claimed in claim 11, wherein when at least two sensing points are selected, the maximal sensing value or the minimal sensing value of the selected sensing points is reduced.

16. The method as claimed in claim 12, wherein when at least two sensing points are selected, the maximal sensing value or the minimal sensing value of the selected sensing points is reduced.

17. The method as claimed in claim 13, wherein when at least two sensing points are selected, the maximal sensing value or the minimal sensing value of the selected sensing points is reduced.

18. The method as claimed in claim 14, wherein when at least two sensing points are selected, the maximal sensing value or the minimal sensing value of the selected sensing points is reduced.

19. The method as claimed in claim 15, wherein the sensing value of the least one of the selected sensing points is reduced to one half thereof.

20. The method as claimed in claim 16, wherein the sensing value of the least one of the selected sensing points is reduced to one half thereof.

21. The method as claimed in claim 17, wherein the sensing value of the least one of the selected sensing points is reduced to one half thereof.

22. The method as claimed in claim 18, wherein the sensing value of the least one of the selected sensing points is reduced to one half thereof.

23. The method as claimed in claim 1, wherein the range comprising a n×m sensing point array having n rows and m columns, and the step of determining a count of center sensing points of each first touched cluster to be divided comprising:
   summing up the sensing values of the sensing points of each of the n rows (X axis) and those of the sensing points of each of the m columns (Y axis) of the first touched cluster to be divided;
   determining if the sum of the sensing values of the middle row (X axis) is not less than those of the sensing values of the other rows (X axis) and if the sum of the sensing values of the middle column (Y axis) is not less than those of the sensing values of the other columns (Y axis); and
   if the determination of the previous step is positive, the current sensing point is a center sensing point.

24. The method as claimed in claim 20, wherein the range comprising a n×m sensing point array having n rows and m columns, and the step of determining a count of center sensing points of each first touched cluster to be divided comprising:
   summing up the sensing values of the sensing points of each of the n rows (X axis) and those of the sensing points of each of the m columns (Y axis) of the first touched cluster to be divided;
   determining if the sum of the sensing values of the middle row (X axis) is not less than those of the sensing values of the other rows (X axis) and if the sum of the sensing values of the middle column (Y axis) is not less than those of the sensing values of the other columns (Y axis); and
   if the determination of the previous step is positive, the current sensing point is a center sensing point.

25. The method as claimed in claim 21, wherein the range comprising a n×m sensing point array having n rows and m columns, and the step of determining a count of center sensing points of each first touched cluster to be divided comprising:
   summing up the sensing values of the sensing points of each of the n rows (X axis) and those of the sensing points of each of the m columns (Y axis) of the first touched cluster to be divided;
   determining if the sum of the sensing values of the middle row (X axis) is not less than those of the sensing values of the other rows (X axis) and if the sum of the sensing values of the middle column (Y axis) is not less than those of the sensing values of the other columns (Y axis); and
   if the determination of the previous step is positive, the current sensing point is a center sensing point.

26. The method as claimed in claim 22, wherein the range comprising a n×m sensing point array having n rows and m columns, and the step of determining a count of center sensing points of each first touched cluster to be divided comprising:
   summing up the sensing values of the sensing points of each of the n rows (X axis) and those of the sensing points of each of the m columns (Y axis) of the first touched cluster to be divided;
   determining if the sum of the sensing values of the middle row (X axis) is not less than those of the sensing values of the other rows (X axis) and if the sum of the sensing values of the middle column (Y axis) is not less than those of the sensing values of the other columns (Y axis); and
   if the determination of the previous step is positive, the current sensing point is a center sensing point.

27. The method as claimed in claim 1, wherein when the touched cluster to be identified is smaller than the first preset division range and is greater than the second preset division range, the touched cluster to be identified is determined as a second touched cluster to be divided.

28. The method as claimed in claim 27, wherein the at least one touched cluster to be identified is read from the sensing frame scanned and outputted by a touch panel.

29. The method as claimed in claim 28, further comprising a division statistical reference step of:
   accumulating a count of divisions of multiple previous sensing frames; and
   presetting a first statistical critical value and a second statistical critical value greater than the first statistical critical value;
   wherein
   after the step of determining that the first touched cluster to be divided is confirmed to have multiple center sensing points, the first touched cluster to be divided is divided if the number of divisions is greater than a first statistical critical value and remains undivided if the number of divisions is lower than the first statistical critical value; and
   the second touched cluster to be divided is divided if the current number of divisions is greater than the second statistical critical value, and remains undivided if the current number of divisions is less than the second statistical critical value.

30. The method as claimed in claim 29, further comprising a step for updating the number of divisions having steps of:
   accumulating the number of divisions after all first touched clusters to be divided of previous one sensing frame are divided until the accumulated number of division reaches an upper limit;
   if all the first touched clusters to be divided in the previous one sensing frame are not divided, reducing the number of divisions until the number of divisions reaches a lower limit; and
   after part of the first touched clusters to be divided of previous one sensing frame are divided, resetting the number of divisions to be a preset value.

31. The method as claimed in claim 30, wherein the step for updating the number of divisions is performed before the division statistical reference step.

32. The method as claimed in claim 30, wherein the step for updating the number of divisions is performed after the step of dividing the first touched cluster to be divided.

33. The method as claimed in claim 30, wherein the step for updating the number of divisions is performed after the step of determining that the number of divisions is greater than the second statistical critical value.

34. The method as claimed in claim 30, wherein the step for updating the number of divisions is performed after the step of dividing the second touched cluster to be divided.

35. The method as claimed in claim 28, wherein each of the first preset division range and the second preset division range is a critical value of size (a count of sensing points), a length along X axis (a count of sensing points along X axis) or a length along Y axis (a count of sensing points along Y axis).

36. The method as claimed in claim 29, wherein each of the first preset division range and the second preset division range is a critical value of size (a count of sensing points), a length along X axis (a count of sensing points along X axis) or a length along Y axis (a count of sensing points along Y axis).

37. The method as claimed in claim 30, wherein each of the first preset division range and the second preset division range is a critical value of size (a count of sensing points), a length along X axis (a count of sensing points along X axis) or a length along Y axis (a count of sensing points along Y axis).

38. The method as claimed in claim 31, wherein each of the first preset division range and the second preset division range is a critical value of size (a count of sensing points), a length along X axis (a count of sensing points along X axis) or a length along Y axis (a count of sensing points along Y axis).

39. The method as claimed in claim 32, wherein each of the first preset division range and the second preset division range is a critical value of size (a count of sensing points), a length along X axis (a count of sensing points along X axis) or a length along Y axis (a count of sensing points along Y axis).

40. The method as claimed in claim 33, wherein each of the first preset division range and the second preset division range is a critical value of size (a count of sensing points), a length along X axis (a count of sensing points along X axis) or a length along Y axis (a count of sensing points along Y axis).

41. The method as claimed in claim 34, wherein each of the first preset division range and the second preset division range is a critical value of size (a count of sensing points), a length along X axis (a count of sensing points along X axis) or a length along Y axis (a count of sensing points along Y axis).

42. The method as claimed in claim 27, wherein the step of determining a count of center sensing points of each first touched cluster to be divided comprising determining a sensing point with the highest sensing value within the range as the center sensing point.

43. The method as claimed in claim 28, wherein the step of determining a count of center sensing points of each first touched cluster to be divided comprising determining a sensing point with the highest sensing value within the range as the center sensing point.

44. The method as claimed in claim 29, wherein the step of determining a count of center sensing points of each first touched cluster to be divided comprising determining a sensing point with the highest sensing value within the range as the center sensing point.

45. The method as claimed in claim 30, wherein the step of determining a count of center sensing points of each first touched cluster to be divided comprising determining a sensing point with the highest sensing value within the range as the center sensing point.

46. The method as claimed in claim 31, wherein the step of determining a count of center sensing points of each first touched cluster to be divided comprising determining a sensing point with the highest sensing value within the range as the center sensing point.

47. The method as claimed in claim 32, wherein the step of determining a count of center sensing points of each first touched cluster to be divided comprising determining a sensing point with the highest sensing value within the range as the center sensing point.

48. The method as claimed in claim 33, wherein the step of determining a count of center sensing points of each first touched cluster to be divided comprising determining a sensing point with the highest sensing value within the range as the center sensing point.

49. The method as claimed in claim 42, wherein when at least two sensing points are selected, the maximal sensing value or the minimal sensing value of the selected sensing points is reduced.

50. The method as claimed in claim 43, wherein when at least two sensing points are selected, the maximal sensing value or the minimal sensing value of the selected sensing points is reduced.

51. The method as claimed in claim 44, wherein when at least two sensing points are selected, the maximal sensing value or the minimal sensing value of the selected sensing points is reduced.

52. The method as claimed in claim 45, wherein when at least two sensing points are selected, the maximal sensing value or the minimal sensing value of the selected sensing points is reduced.

53. The method as claimed in claim 46, wherein when at least two sensing points are selected, the maximal sensing value or the minimal sensing value of the selected sensing points is reduced.

54. The method as claimed in claim 47, wherein when at least two sensing points are selected, the maximal sensing value or the minimal sensing value of the selected sensing points is reduced.

55. The method as claimed in claim 48, wherein when at least two sensing points are selected, the maximal sensing value or the minimal sensing value of the selected sensing points is reduced.

56. The method as claimed in claim 49, wherein the sensing value of the least one of the selected sensing points is reduced to one half thereof.

57. The method as claimed in claim 50, wherein the sensing value of the least one of the selected sensing points is reduced to one half thereof.

58. The method as claimed in claim 51, wherein the sensing value of the least one of the selected sensing points is reduced to one half thereof.

59. The method as claimed in claim 52, wherein the sensing value of the least one of the selected sensing points is reduced to one half thereof.

60. The method as claimed in claim 53, wherein the sensing value of the least one of the selected sensing points is reduced to one half thereof.

61. The method as claimed in claim 54, wherein the sensing value of the least one of the selected sensing points is reduced to one half thereof.

62. The method as claimed in claim 55, wherein the sensing value of the least one of the selected sensing points is reduced to one half thereof.

63. The method as claimed in claim 27, wherein the range comprising a n×m sensing point array having n rows and m columns, and the step of determining a count of center sensing points of each first touched cluster to be divided comprising:
- summing up the sensing values of the sensing points of each of the n rows (X axis) and those of the sensing points of each of the m columns (Y axis) of the first touched cluster to be divided;
- determining if the sum of the sensing values of the middle row (X axis) is not less than those of the sensing values of the other rows (X axis) and if the sum of the sensing values of the middle column (Y axis) is not less than those of the sensing values of the other columns (Y axis); and
- if the determination of the previous step is positive, the current sensing point is a center sensing point.

64. The method as claimed in claim 28, wherein the range comprising a n×m sensing point array having n rows and m columns, and the step of determining a count of center sensing points of each first touched cluster to be divided comprising:
- summing up the sensing values of the sensing points of each of the n rows (X axis) and those of the sensing points of each of the m columns (Y axis) of the first touched cluster to be divided;
- determining if the sum of the sensing values of the middle row (X axis) is not less than those of the sensing values of the other rows (X axis) and if the sum of the sensing values of the middle column (Y axis) is not less than those of the sensing values of the other columns (Y axis); and
- if the determination of the previous step is positive, the current sensing point is a center sensing point.

65. The method as claimed in claim 29, wherein the range comprising a n×m sensing point array having n rows and m columns, and the step of determining a count of center sensing points of each first touched cluster to be divided comprising:
- summing up the sensing values of the sensing points of each of the n rows (X axis) and those of the sensing points of each of the m columns (Y axis) of the first touched cluster to be divided;
- determining if the sum of the sensing values of the middle row (X axis) is not less than those of the sensing values of the other rows (X axis) and if the sum of the sensing values of the middle column (Y axis) is not less than those of the sensing values of the other columns (Y axis); and
- if the determination of the previous step is positive, the current sensing point is a center sensing point.

66. The method as claimed in claim 30, wherein the range comprising a n×m sensing point array having n rows and m columns, and the step of determining a count of center sensing points of each first touched cluster to be divided comprising:
- summing up the sensing values of the sensing points of each of the n rows (X axis) and those of the sensing points of each of the m columns (Y axis) of the first touched cluster to be divided;
- determining if the sum of the sensing values of the middle row (X axis) is not less than those of the sensing values of the other rows (X axis) and if the sum of the sensing values of the middle column (Y axis) is not less than those of the sensing values of the other columns (Y axis); and
- if the determination of the previous step is positive, the current sensing point is a center sensing point.

67. The method as claimed in claim 31, wherein the range comprising a n×m sensing point array having n rows and m columns, and the step of determining a count of center sensing points of each first touched cluster to be divided comprising:
- summing up the sensing values of the sensing points of each of the n rows (X axis) and those of the sensing points of each of the m columns (Y axis) of the first touched cluster to be divided;
- determining if the sum of the sensing values of the middle row (X axis) is not less than those of the sensing values of the other rows (X axis) and if the sum of the sensing values of the middle column (Y axis) is not less than those of the sensing values of the other columns (Y axis); and
- if the determination of the previous step is positive, the current sensing point is a center sensing point.

68. The method as claimed in claim 32, wherein the range comprising a n×m sensing point array having n rows and m columns, and the step of determining a count of center sensing points of each first touched cluster to be divided comprising:
- summing up the sensing values of the sensing points of each of the n rows (X axis) and those of the sensing points of each of the m columns (Y axis) of the first touched cluster to be divided;
- determining if the sum of the sensing values of the middle row (X axis) is not less than those of the sensing values of the other rows (X axis) and if the sum of the sensing values of the middle column (Y axis) is not less than those of the sensing values of the other columns (Y axis); and
- if the determination of the previous step is positive, the current sensing point is a center sensing point.

69. The method as claimed in claim 33, wherein the range comprising a n×m sensing point array having n rows and m columns, and the step of determining a count of center sensing points of each first touched cluster to be divided comprising:
- summing up the sensing values of the sensing points of each of the n rows (X axis) and those of the sensing points of each of the m columns (Y axis) of the first touched cluster to be divided;
- determining if the sum of the sensing values of the middle row (X axis) is not less than those of the sensing values of the other rows (X axis) and if the sum of the sensing values of the middle column (Y axis) is not less than those of the sensing values of the other columns (Y axis); and
- if the determination of the previous step is positive, the current sensing point is a center sensing point.

70. A method for identifying multiple touch objects, comprising steps of:
- reading a count of divisions;
- reading a touched cluster to be identified in a sensing frame and determining a range of the touched cluster to be identified;
- comparing the range of the touched cluster to be identified with a preset division range;
- if the range of the touched cluster to be identified exceeds the preset division range, determining if the number of divisions is greater than a preset critical value;

if the number of divisions is greater than the preset critical value, determining the touched cluster to be identified as a touched cluster to be divided corresponding to multiple touch objects; and updating the number of divisions.

71. The method as claimed in claim 70, wherein the number of divisions is accumulated to the number of divisions of multiple previous sensing frames.

72. The method as claimed in claim 70, wherein the preset division range is a critical value of size (a count of sensing points), a length along X axis (a count of sensing points along X axis) or a length along Y axis (a count of sensing points along Y axis).

73. The method as claimed in claim 70, wherein the preset division range is a critical value of size (a count of sensing points), a length along X axis (a count of sensing points along X axis) or a length along Y axis (a count of sensing points along Y axis).

74. The method as claimed in claim 71, wherein the preset division range is a critical value of size (a count of sensing points), a length along X axis (a count of sensing points along X axis) or a length along Y axis (a count of sensing points along Y axis).

75. The method as claimed in claim 72, wherein the step of updating the number of divisions has steps of:

accumulating the number of divisions after all touched clusters to be divided of previous one sensing frame are divided until the accumulated number of divisions reaches an upper limit; and if all the first touched clusters to be divided in the previous one sensing frame are not divided, reducing the number of divisions until the number of divisions reaches a lower limit.

76. The method as claimed in claim 73, wherein the step of updating the number of divisions has steps of:

accumulating the number of divisions after all touched clusters to be divided of previous one sensing frame are divided until the accumulated number of divisions reaches an upper limit; and if all the first touched clusters to be divided in the previous one sensing frame are not divided, reducing the number of divisions until the number of divisions reaches a lower limit.

77. The method as claimed in claim 74, wherein the step of updating the number of divisions has steps of:

accumulating the number of divisions after all touched clusters to be divided of previous one sensing frame are divided until the accumulated number of divisions reaches an upper limit; and if all the first touched clusters to be divided in the previous one sensing frame are not divided, reducing the number of divisions until the number of divisions reaches a lower limit.

78. The method as claimed in claim 72, wherein the step of updating the number of divisions further has a step of resetting the number of divisions to be a preset value after part of the touched clusters to be divided of previous one sensing frame are divided.

79. The method as claimed in claim 73, wherein the step of updating the number of divisions further has a step of resetting the number of divisions to be a preset value after part of the touched clusters to be divided of previous one sensing frame are divided.

80. The method as claimed in claim 74, wherein the step of updating the number of divisions further has a step of resetting the number of divisions to be a preset value after part of the touched clusters to be divided of previous one sensing frame are divided.

81. A method for identifying multiple touch objects, comprising steps of:

reading a touched cluster to be divided; and selecting one sensing point intersected by a middle column and a middle row of the first touched cluster to be divided when a count of sensing points along X axis is odd and a count of sensing points along Y axis is odd, and reducing a sensing value of the selected sensing point;

selecting two sensing points intersected by a middle column and two adjacent middle rows of the first touched cluster to be divided when a count of sensing points along X axis is odd and a count of sensing point along Y axis is even, and reducing a sensing value of at least one of the two selected sensing points;

selecting two sensing points intersected by a middle row and two adjacent middle columns of the first touched cluster to be divided when a count of sensing points along X axis is even and a count of sensing points along Y axis is odd, and reducing a sensing value of at least one of the two selected sensing points;

selecting four sensing points intersected by two adjacent middle rows and two adjacent middle columns of the first touched cluster to be divided when a count of sensing points along X axis is even and a count of sensing points along Y axis is even, and reducing a sensing value of at least one of the four selected sensing points;

determining a count of center sensing points of the touched cluster to be divided, wherein each sensing point is aligned with a center of a range consisting of multiple sensing points, the center sensing point is determined according to the sensing values of the sensing points within the range; and dividing the touched cluster to be divided containing multiple center sensing points.

82. The method as claimed in claim 81, wherein when at least two sensing points are selected, the maximal sensing value or the minimal sensing value of the selected sensing points is reduced.

83. The method as claimed in claim 82, wherein the sensing value of the least one of the selected sensing points is reduced to one half thereof.

* * * * *